fig.11.

| DRAWING NO. | CONTROL PORTS | | | OUTLET PORTS | | |
|---|---|---|---|---|---|---|
| | $C_1$ | $C_2$ | $C_3$ | $O_1$ | $O_2$ | $O_3$ |
| fig.4. | 0 | 0 | 0 | 1 | 1/2 | 1/2 |
| fig.5. | X | 0 | 0 | 2 | 0 | 0 |
| fig.6. | $X_a$ | $X_b$ | 0 | 0 | 2 | 0 |
| fig.7. | 0 | X | 0 | 1/2 | 1 | 1/2 |
| fig.8. | 0 | X | X | 0 | 1 | 1 |
| fig.9. | $X_a$ | 0 | $X_b$ | 0 | 0 | 2 |
| fig.10. | 0 | 0 | X | 1/2 | 1/2 | 1 |

INVENTOR.
George B. Richards,
BY Hume, Clement, Hume & Lee
Attorneys.

United States Patent Office 3,495,253
Patented Feb. 10, 1970

---

3,495,253
PLANAR FLUID AMPLIFIER
George B. Richards, Lake Forest, Ill. 60035
(Box 278, Highland Park, Ill.)
Continuation-in-part of application Ser. No. 623,740, Mar. 16, 1967. This application June 26, 1967, Ser. No. 648,602
Int. Cl. F15c 1/04, 1/08, 3/00
U.S. Cl. 137—81.5
17 Claims

ABSTRACT OF THE DISCLOSURE

A planar-type fluidic element employing a boundary layer self-attachment principle in which a power jet is split into two or more streams and a control fluid pressure differential between opposed surfaces of each stream, primarily governed by the aforesaid principle, directs flow entirely into a central outlet, a series of surrounding split outlets, or proportions flow there between. Various embodiments and variations are presented.

CROSS REFERENCE TO RELATED APPLICATION

This application is a continuation-in-part of George B. Richards application Ser. No. 623,740, filed Mar. 16, 1967, and entitled "Fluid Amplifier." The present application discloses and claims what might be characterized, in part, as a planar species of the power jet fluidic device disclosed and claimed in the above-identified parent application.

BACKGROUND OF THE INVENTION

Field

The invention lies in the field of pure fluid devices, which employ no moving parts, in which a power jet or portions thereof are directed into one or two distinct outlets. The field is further refined to devices in which control is effected through pressure of a secondary fluid rather than through the momentum-exchange principle.

Prior art

The following are examples of prior art of which applicant is aware:

Carlson, Patent No. 3,039,490, June 19,1962; Severson, Patent No. 3,080,886, Mar. 12, 1963; Horton, Patent No. 3,122,165, Feb. 25, 1964; Horton et al., Patent No. 3,185,166, May 25, 1965, and Lewis et al., Patent No. 3,276,423, Oct. 4, 1966.

"Fluid Interaction Control Devices" by C. L. Mamzic, delivered at the Fifth National ISA Chemical and Petroleum Instrumentation Symposium, May 5, 1964;

"Design Guide—Pure Fluid Devices" by O. Lew Wood, Machine Design, June 24, 1965;

"Fluidics and Fluid Power" by Russ Henke, Machine Design, Nov. 25, 1965;

"Focused-Jet Inverter" by Joseph M. Kirshner (paragraph 15.5.4, 238), Fluid Amplifiers, © 1966;

"Fluid Element Data Sheet" pp. 5–60, Fluid Amplifier State of the Art, vol. 1, Research and Development— Fluid Amplifiers and Logic, prepared under Contract No. NAS 8–5408 by General Electric Company, NASA Contractor Report NASA Cr–101, October 1964;

"Basic Requirements for an Analytical Approach to Pure Fluid Control Systems" by H. L. Fox and F. R. Goldschmied, Proceedings of the Fluid Amplification Symposium, May 1964, p. 293.

Some of this prior art relates to momentum-exchange devices, which are properly outside the field of the invention, but they are listed to permit a broader understanding of the improvements afforded through the invention.

No representation is made or intended that a search has been made or that no better art is available than that listed.

SUMMARY OF THE INVENTION

The split power jet fluidic device of this invention improves on other planar devices of the prior art by providing, for example: (a) a considerably faster response time in switching; (b) an increased stability for like control pressures when constructed as either a monostable or bistable device; (c) a greatly increased switching frequency capability when used as an oscillator; (d) greatly increased amplification; and (e) adjustability for achievement of optimum performance regardless of the type of fluid employed. The invention provides the capability for controlling power jets of greater density than the prior art for the reason that twice the area of the power jet is exposed directly to the control pressure as compared with other planar-type fluidic elements; this capability is further enhanced by the fact that the power jet in the inventive construction needs to be deflected only about one-quarter or less the distance required for other comparable planar devices, and the angle of deflection is accordingly much smaller.

The split planar power jet concept of this invention provides an additional versatility over the prior art and over the annular jower jet fluidic element of the aforementioned parent application in that it permits independent control of the two split portions of the power jet. The fluidic device of this invention can be arranged for either selective independent or simultaneous control of the split portions of the power jet.

The power jet in the modulated split jet fluidic device of this invention permits a fluid particle in the power jet to normally travel in a straight line, or nearly so, as compared with the circuitous route required in a focused-jet device, for example. This feature reduces the overall energy losses in the system. The two or more outlet ports are preferably arranged such that a first central port has its major axis common with the longitudinal axis of the entire element and the one or more additional outlet ports are spaced successively outward therefrom, thus requiring the least deviation from straight-line travel of a particle of fluid in a power stream to effect switching.

The internal and external control passages permit adequate space for the use of a plurality of control duct connections.

The configuration is such that the envelope dimensions are the smallest possible for a planar-type fluid amplifier of the boundary layer attachment class.

The device may be advantageously made adjustable externally in order to vary the operational characteristics and to permit achievement of optimum performance without the necessity for extremely close tolerance manufacture.

These and other advantages are achieved through employment of a boundary layer self-attachment effect, in conjunction with the Coanda wall-attachment effect, in a fluidic element using a split power jet which is controlled by a secondary fluid exerting control pressure interally or externally of the two split portions of the power jet to accomplish switching of the jets between two or more distinct outlets. Furthermore, control pressure can be selectively exerted simultaneously or independently against the two split portions of the power jet for additional versatility of switching. The resultant high-speed switching permits more efficient use as a fluid control element or as a logic element for a computer or numerical control system. High-speed switching together with high pressure recovery permits use as a building block in the field of viscous fluid control, for example, and often eliminates the necessity for employment of interface elements.

The various objects of the invention are to provide an improved fluidic device for achieving the various advantages heretofore and hereinafter stated or implied.

DESCRIPTION OF THE PREFERRED EMBODIMENTS

Figure 1:
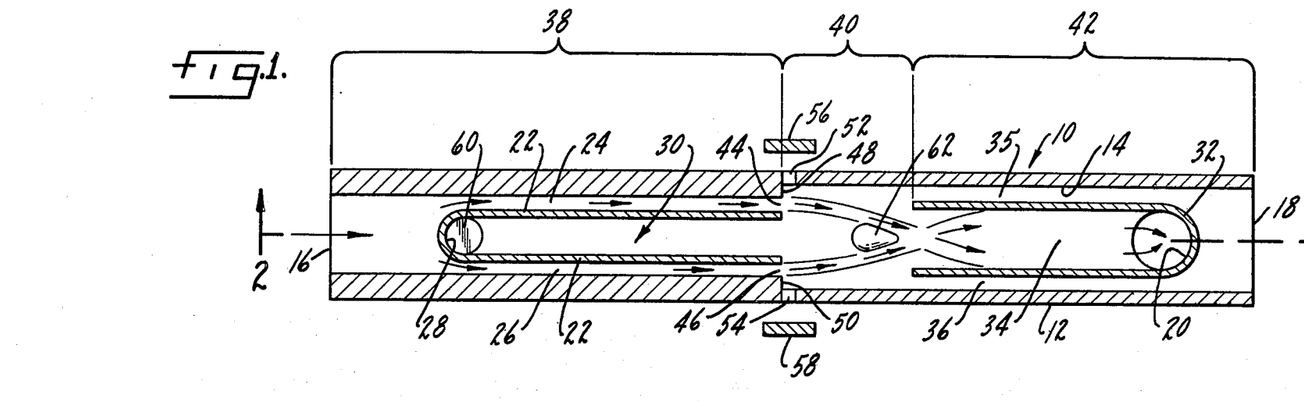
FIGURE 1 is a partly schematic longitudinal top sectional view of a fluidic device according to the present invention, showing the split power jet converging and directed to a central outlet.
Figure 2:
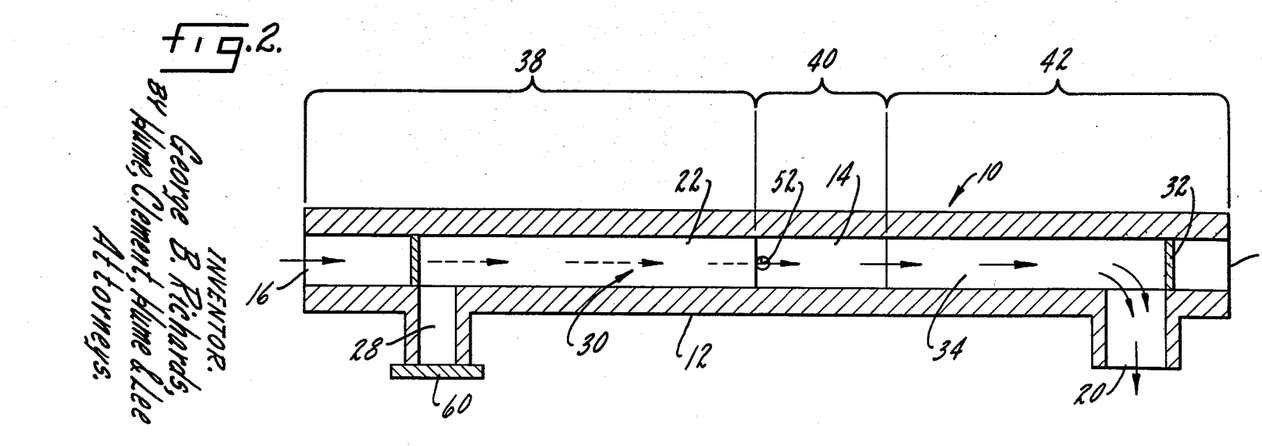
FIGURE 2 is a partly schematic longitudinal side sectional view taken along line 2—2 of FIGURE 1.
Figures 3, 4:
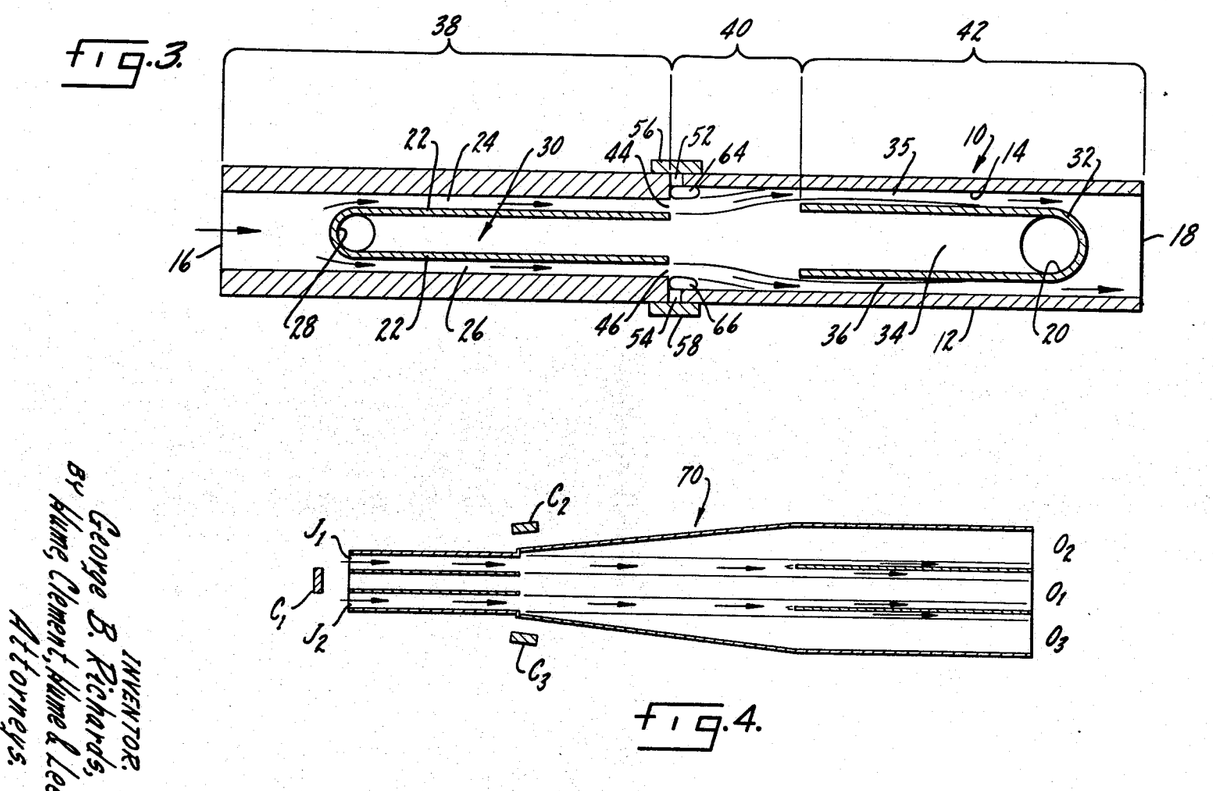
FIGURE 3 is a partly schematic longitudinal top sectional view of the fluidic device of FIGURE 1, but showing the split power jet diverging and directed to the two portions of the surrounding split outlet.
FIGURES 4 through 10 are diagrammatic top sectional views of a fluidic device similar to that of FIGURE 1, showing seven different flow conditions which can be achieved through appropriate manipulation of the control port valves.

The fluidic device of FIGURES 1, 2 and 3 is generally designated by the reference numeral 10. It comprises an elongated housing or casing 12, having a generally axial internal passage 14 therethrough with a power jet inlet 16 at one end and a power jet outlet 18 at the other end. A second power jet outlet 20 is provided near the outlet 18 and is directed at right angles to the axis of the housing 12. The passage 14 is of rectangular cross-section with the depth uniform and the width varying as shown. The device is of the "planar" fluidic type inasmuch as the flow through the region of interaction between the power jet and the control fluid is essentially two dimensional, that is, the directional flow of the fluid power jet is controlled primarily in one plane.

An inlet flow separator 22 is of a generally U-shape configuration and is disposed in the casing 12 with its upper and lower marginal edges secured in sealed relation to the upper and lower surfaces of the passage 14. The arrangement is such that a power jet directed into the inlet 16 is split by the separator 22 and flows through two separated passages 24 and 26 as it passes the separator. Of course, the surface of the separator facing the power jet may be of a streamlined contour to minimize energy loss in the jet. A control port 28 extends through the lower wall of the casing 12 adjacent the bight end of the separator 22 and communicates with an internal control passage 30 which is defined between the legs of the separator.

An outlet flow separator 32 of U-shape configuration is centrally disposed in the passage 14 a predetermined distance downstream of the inlet separator 22 with its open end facing the oncoming power jet fluid. The upper and lower marginal edges of the separator 32 are likewise secured in sealed relation to the transverse upper and lower surfaces of the passage 14. An outlet port 20 extends through the lower wall of the casing, immediately upstream of the bight of the separator 32, to communicate with an outlet passage 34 formed between the separator portions. A pair of split outlet passages 35 and 36 are formed between the outer surfaces of the legs of the separator and respective opposite walls of the casing 12. These split outlet passages units downstream of the separator at the outlet 18.

The fluidic device 10 is functionally separated into three sections or zones, an inlet section 38, an interaction section 40, and an outlet section 42. The juncture between the inlet section 38 and the interaction section 40 is formed at the downstream end of the separator 22, at which point a pair of power jet nozzles 44 and 46 direct power jet flow from the split passages 24 and 26, respectively, in to the interaction section 40. The control passage 30 communicates with the interaction section 40 between the power jet nozzles 44 and 46. At or slightly upstream of the open end of separator 22, the vertical sidewalls of the passage 14 are provided with diverging steps 48 and 50 of sufficient depth to accommodate formation of Coanda effect separation bubbles under operating conditions to be described.

The juncture of the interaction section 40 and the outlet section 42 occurs at the upstream or open end of the outlet separator 32. The transition between these sections is defined by the presence of the separator; the wall of the passage 14 in the transition region is smooth and continuous.

Immediately downstream of the steps 48 and 50 a pair of control ports 52 and 54 are formed through the casing 12 on opposite sidewalls thereof to communicate with the intersection section 40. The control ports 52 and 54 are selectively opened or closed by any suitable means, such as the respective valve discs 56 and 58. Similarly, the port 28 may be selectively opened as closed by any suitable means, such as valve disc 60 (FIGURE 2).

The fluidic device 10 was referred to originally as being partly schematic primarily because of the schematic showing of valve discs 56, 58 and 60 inasmuch as any known means of selectivly inhibiting control flow may be used.

When the control port 28 is closed and the control ports 52 and 54 are open, as shown in FIGURES 1 and 2, the two portions of the power jet are caused to converge in the interaction section 40 and pass as a solid stream into the outlet passage 34, and thence through the outlet 20. It has been found that such action occurs because the inwardly facing boundaries of the two split portions of the power jet entrain air which air cannot be replenished inasmuch as the control port 28 is closed, thereby causing a partial vacuum in the confined space between the power jet portions. Although the outside surfaces of the split power jet also entrain air, this air is replenished through the control ports 52 and 54 which are open. Consequently, the pressure against the outside surfaces of the power jet is greater than the internal pressure, causing the two portions of the jet to converge and attach to one another, forming a separation bubble 62 immediately upstream of the point of convergence. This will be recognized as the self-attachment effect described in connection with applicant's parent application Ser. No. 613,740, except that in the present instance the power jet is planar, while in the earlier application the power jet is specifically disclosed as being annular. It has been found that a partial closure of the central control port converges the streams in approximate proportion to the extent control fluid is inhibited from entering the port. Thus the present construction may effectively serve as a proportional amplifier for an analogue computer or the like.

In FIGURE 3, the fluidic device 10 is shown with the control ports 52 and 54 closed and, although not visible, the control port 28 is now open. Air is thus communicated to the vacuum in the interaction region or chamber 40 between the two portions of the power jet and the upper and lower walls of the casing and separation bubble 62 disappears with the result that the two split portions of the power jet tend to separate. At the same time, closure of the control ports 52 and 54 prevents air which is entrained by the vertical outer boundaries of the two split portions of the power jet from being adequately replenished, causing formation of a partial vacuum between each jet and its associated sidewall. Hence, the natural linear momentum of the jets and the reversal in pressure between opposite sides of each jet immediately forces the jets to diverge and to attach to the walls of the passage 14 within the interaction chamber, causing formation of respective separation bubbles 64 and 66 according to the Coanda wall-attachment effect. If the control port 28 is subsequently closed while the control ports 52 and 54 remain closed, the flow will continue as shown in FIGURE 3, inasmuch as the two split portions of the power jet are locked onto the walls and the reduction of pressure in the confined space is inadequate to overcome these locking forces. If, however, the control ports 52 and 54 are then opened, the flow will very quickly switch to the condition shown in FIGURES 1 and 2.

By the same token, with the flow as shown in FIGURES 1 and 2, no change will occur if either or both of the control ports 52 and 54 are closed, as long as the control port 28 remains closed. This is because the two split portions of the power jet are effectively locked to one another and the open passages 35 and 36 now provide adequate sources for replenishing the air entrained by the outer surfaces of the power jets. However, if the control port 28 is now opened, the flow will immediately switch to the condition shown in FIGURE 3.

The switching time between the two steady state flow conditions depicted in FIGURES 1 and 3 takes only a few milliseconds or less if the power jet fluid is a liquid, such as water and the secondary or control flow is a gas, such as air. If the power jet is gaseous, the time required for convergence or divergence of the power jet, as the case may be, is very much faster since the mass which must be shifted is relatively slight.

Although outlet passages 35 and 36 are shown as uniting into a single outlet beyond separator 32, it is not necessary that these two outlet passages be connected. In other words, the passages 35 and 36 may lead to separate exit conduits thereby providing fluidic device 10 with three distinct outlets, rather than two as hereinbefore described.

By the same token, the split power jet inlet passages 24 and 26 need not have a common source. For example, the inlet passages 24 and 26 may be coupled to different power jet sources and the device 10 may be used to selectively mix or separate the fluids whether these fluids be of like or different composition.

Figure 9:
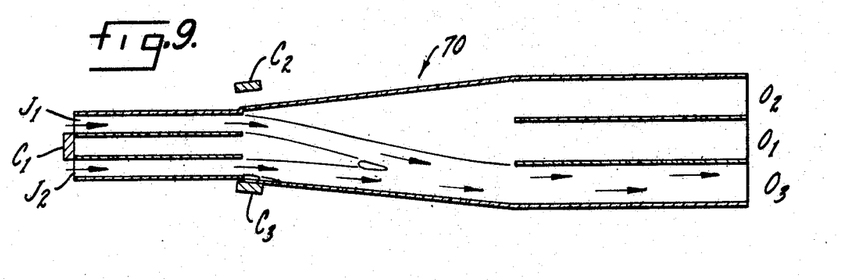
Figure 10:
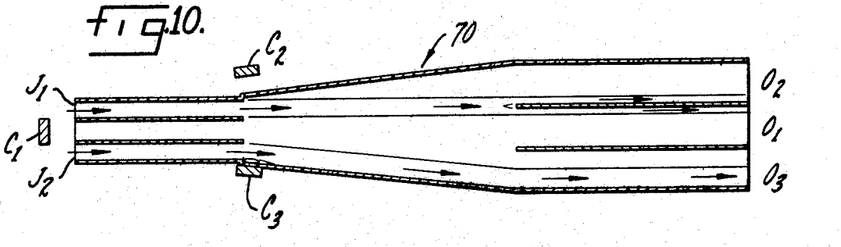
Figure 11:
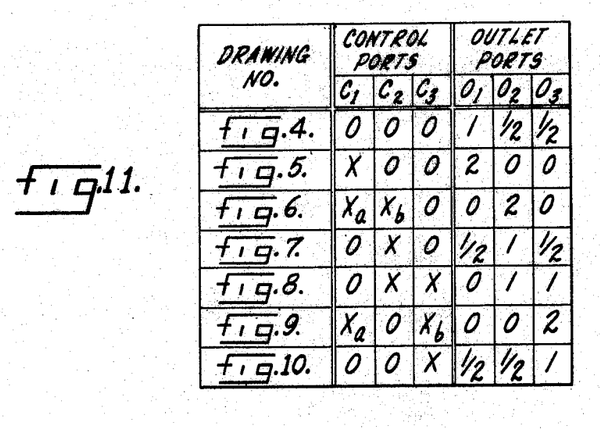
FIGURE 11 is a logical truth table for the various flow conditions shown in FIGURES 4 through 10.

The diagrammatic illustration of FIGURES 4–10 and the truth table of FIGURE 11 illustrate various flow conditions which can be achieved by means of the present invention. In FIGURES 4–10, a diagrammatically illustrated fluidic device 70 is shown having separate, transversely spaced power jet inlets $J_1$ and $J_2$, a central outlet passage $O_1$, and outlet passages $O_2$ and $O_3$ disposed on opposite sides of the central outlet. Flow of the power jets is controlled by a central control port and valve arrangement $C_1$ and two further control ports and valve arrangements $C_2$ and $C_3$ disposed in opposite sidewalls of device 70 just downstream of the divergent steps in these walls which mark the beginning of the fluid interaction section. It will be understood that while the fluidic device 70 is diagrammatically shown with the sidewalls of its interaction section tapering outwardly to meet an enlarged outlet section, the device is still of the basic split power jet planar type illustrated in FIGURES 1–3, and the actual construction may be identical to that of fluidic device 10, except for connection of the power jet inlets and power jet outlets $O_2$ and $O_3$ to respective individual inlet and outlet conduits. However, the power jet inlets $J_1$ and $J_2$ may be supplied from a common source if desired, and any two of the outlets may be united at some point downstream.

In FIGURE 4 all three control ports $C_1$, $C_2$ and $C_3$ are open so that within the limited axial length of the interaction section the integrity of the two power jets is maintained and they neither diverge or converge and are consequently evenly split by the two spaced vertical walls which form the dividers for the several outlets. Accordingly, one-half of the power jet fluid at inlet $J_1$ flows into each of outlets $O_1$ and $O_2$ while one-half of power jet fluid inlet $J_2$ flows into outlets $O_1$ and $O_3$, respectively. This condition is represented in the truth table in the columns of the top row adjacent the notation "FIG. 4." The zeros in the three control port columns denote that these ports are each open. A total inlet flow of two units is assumed and the relative proportioning of this flow between the individual outlets is indicated beneath the corresponding column headings.

Figure 5:
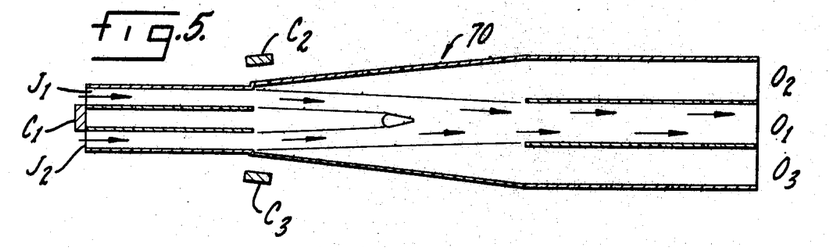

In FIGURE 5, control port $C_1$ is closed, and control ports $C_2$ and $C_3$ are maintained in an open condition, causing the power jets to converge into a solid stream and flow into outlet $O_1$. Looking at the truth table in the "FIG. 5" row, the X in the $C_1$ column denotes that this control port is closed while the zeros in the $C_2$ and $C_3$ columns indicate that these control ports are open. In the outlet column, the zeros in the $O_2$ and $O_3$ columns denote an absence of fluid flow in these outlets while the "2" in the $O_1$ column indicates that the entire two unit input is existing via this outlet port.

Figure 6:
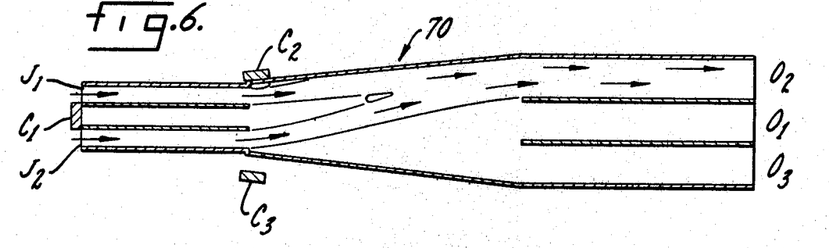

FIGURE 6 illustrates the condition where the control port $C_1$ is first closed with the two control ports $C_2$ and $C_3$ open to achieve a flow condition as in FIGURE 5 and then subsequently control port $C_2$ is closed, causing the entire converged jet to be diverted entirely into outlet $O_2$. This sequence is essential to attainment of this flow condition since the distance separating the two power jets would be increased beyond the maximum distance at which self-attachment would effectively converge the streams if control port $C_2$ were closed first. However, convergence of the jets does not shift the flow sufficiently far away from the control port $C_2$ to prevent diversion since this control port is positioned immediately downstream of the power jet nozzle. Hence, conditions remain suitable for achieving a Coanda wall-attachment affect.

If the two control ports $C_1$ and $C_2$ are closed simultaneously, only the fluid at power jet inlet $J_1$ is diverted to the wall; the fluid of power jet $J_2$ will not attach to the other power jet but will continue to flow as shown in FIGURE 4. This is because in the illustrated construction the space between the wall and the fluid at power jet inlet $J_1$ is smaller than the space between the two power jets, so that the pressure adjacent the wall is reduced more rapidly; hence the jet $J_1$ attaches to the wall before the two jets can converge. The dependence of the flow condition of FIGURE 6 on the sequence in which the control ports $C_1$ and $C_2$ are closed is denoted by using the alphabetical sequence indicating subscripts $a$ and $b$ in conjunction with symbol X in the truth table. The control port $C_3$ remains open as indicated by the zero in that column. The absence of flow in outlets $O_1$ and $O_3$ is indicated by the zeros in these columns, while the combined flow of the two power jets out the outlet $O_2$ is indicated by the numeral 2 in that column.

Figure 7:
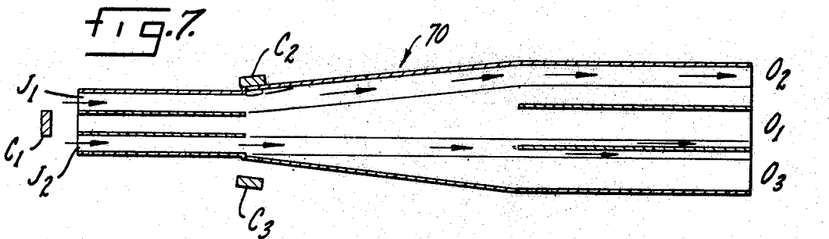

The condition illustrated in FIGURE 7 is achieved when the control port $C_2$ is closed while the control ports $C_1$ and $C_3$ remain open. The sequence of opening and closing the control ports to achieve the flow condition of FIGURE 7 is unimportant. In this condition, the power jet of inlet $J_1$ attaches to the wall adjacent outlet $C_2$, and a separation bubble is formed, so that the entire power jet flows into outlet $O_2$ while the power jet of inlet $J_2$ is undisturbed. This condition is represented in the truth table adjacent "FIG. 7" by use of the same logic symbols.

Figure 8:
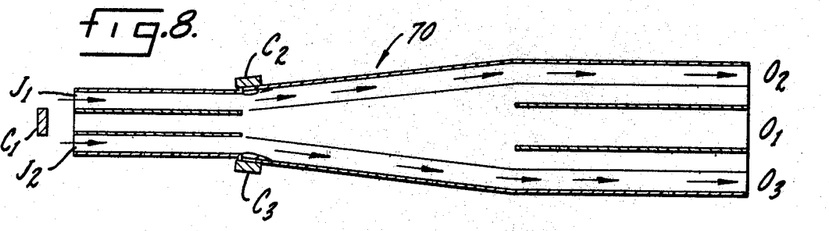

The flow condition of FIGURE 8 is obtained when control ports $C_2$ and $C_3$ are closed while control port $C_1$ remains open. This causes the power jets at inlets $J_1$ and $J_2$ to attach to the walls adjacent respective control ports $C_2$ and $C_3$ and flow completely into respective ones of outlets $O_2$ and $O_3$. The sequence of closing control ports $C_2$ and $C_3$ and of opening the control port $C_1$ is unimportant, since the flow condition shown is obtained once the control ports are in the condition shown, independent of sequence. Hence, no subscripts are used in conjunction with the symbols in the three control port columns of the truth table for the "FIG. 8" condition.

The flow condition of FIGURE 9 is the reverse of that of FIGURE 6, and the condition is achieved by first closing central control port $C_1$ to cause the two power jets to converge and attach to one another and by then subsequently closing the control port $C_3$ to cause the entire converged flow to attach to the wall adjacent control port $C_3$ and flow entirely into outlet passage $O_3$. In the truth table $a$ and $b$ subscripts again denote the required valve closing sequence.

The flow condition of FIGURE 10 is the reverse of that shown in FIGURE 7. Control ports $C_1$ and $C_2$ are open, while control port $C_3$ is closed. This flow condition is again shown in tabular form in the truth table of FIGURE 11.

In connection with the diagrammatic illustrations of FIGURES 4–10, it will be understood that the various flow values in the truth table are achieved because the outlet flow separators are disposed on the central axes of the respective power jets. The proportioning of fluid flow between the several outlets is readily altered, however, by moving either or both of the flow separators laterally with respect to the oncoming power jets. For example, and with specific reference to FIGURE 4, movement of the flow separator between outlets $O_1$ and $O_2$ transversely outwardly a sufficient amount results in the entire flow of the power jet of inlet $J_1$ being confined to outlet $O_1$; on the other hand, movement of this separator transversely inwardly a proper distance locates the entire flow within outlet $O_2$; and movement between these limits effects a selected division of flow between the two outlets. The same flow variation of the power jet of inlet $J_2$ can be achieved by making similar transverse alterations in the position of the separator between outlets $O_1$ and $O_3$. The same change in flow proportioning can be accomplished by changing the transverse spacing between the power jet inlets $J_1$ and $J_2$, for instance, by widening or narrowing the channel of control port $C_1$ while corresponding adjustments are made in the spacing of the outer walls to maintain a constant flow volume.

Figure 12:
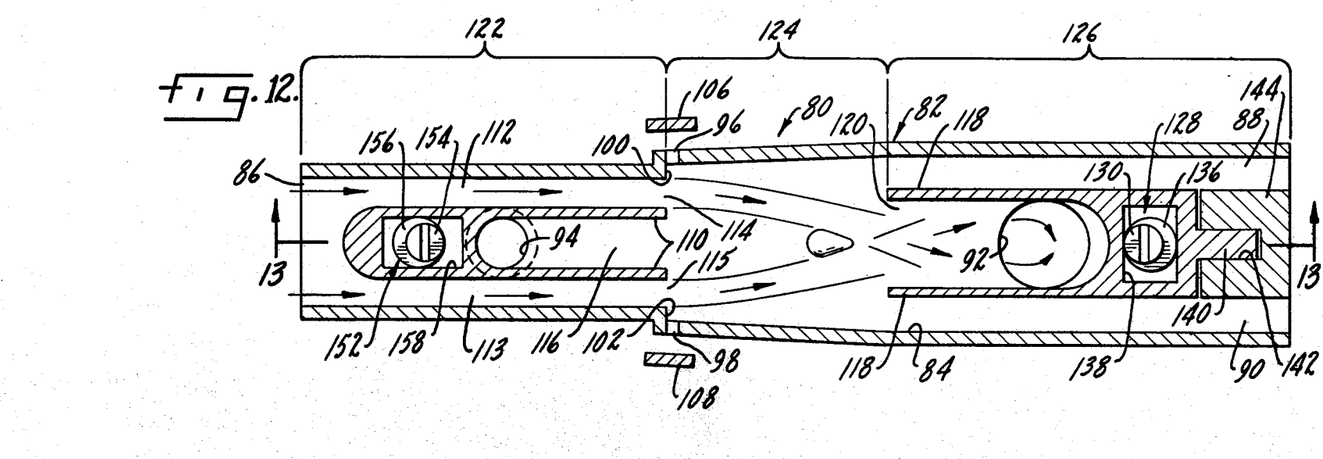
FIGURE 12 is a partly schematic longitudinal top sectional view of another embodiment of fluidic device according to the present invention incorporating means for external adjustment to vary the operational characteristic.
Figure 13:
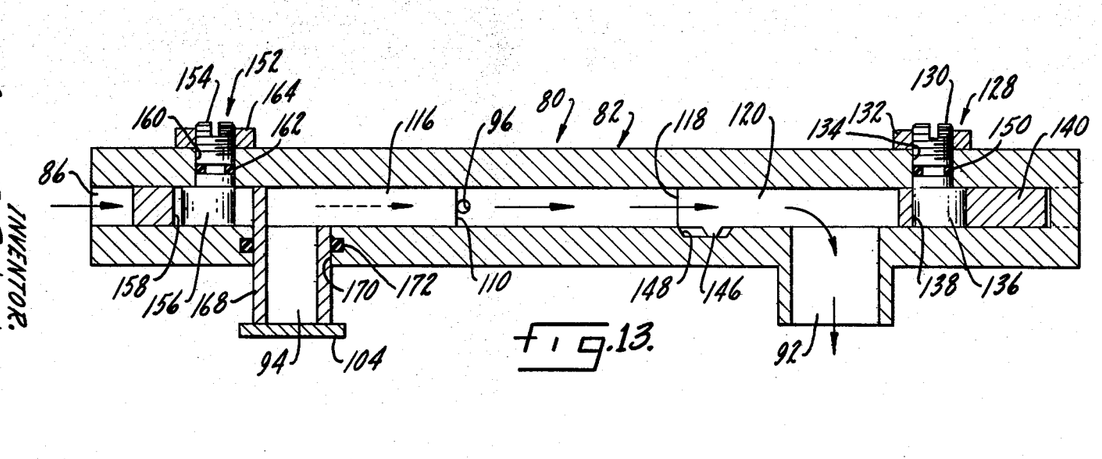
FIGURE 13 is a partly schematic longitudinal side sectional view taken along lines 13—13 of FIGURE 12.

FIGURES 12 and 13 illustrate another embodiment of a planar fluidic device according to the present invention in which the axial length of the interaction chamber and the thickness of the split power jets are externally adjustable. The fluidic device of these two figures is generally designated by the reference numeral 80 and comprises an elongated casing or housing 82, which is quite similar in construction and arrangement to the casing 12 of the embodiment of FIGURES 1, 2 and 3. It contains a generally axial internal passage 84 therethrough, having a power jet inlet 86 at one end, and a pair of split power jet outlets 88 and 90 at the other end. A central outlet 92 is provided between outlets 88 and 90 and is directed at right angles to the axis of housing 82. A central control port 94 is formed in the housing near the power jet inlet and a pair of control ports 96 and 98 are formed through the wall of casing 82 immediately downstream of a pair of divergent steps 100 and 102 formed in respective sidewalls of passage 84. Flow of a control fluid, such as air, into the control ports 94, 96, and 98 is selectively inhibited or totally precluded by any suitable valve means, such as the respective schematically illustrated valve discs 104, 106, and 108.

The power jet flow into the passage 86 is split by means of an inlet flow separator 110 of U-shaped configuration having elongated legs normally arranged parallel to respective adjacent walls of the passage to form two similar power jet passages 112 and 114. The control port 94 communicates with a central control passage 116 formed between the legs of separator 110.

Downstream of the inlet flow separator 110 is an outlet separator 118 of U-shaped configuration, likewise disposed with its elongated legs parallel to adjacent passage walls and its open end facing upstream to define split outlets 88 and 90 and a central outlet channel 120 communicating with the vertical outlet passage 92.

The fluidic device 80 is functionally separated into three sections; an inlet section 122, an interaction section 124, and an outlet section 126, respectively corresponding to inlet section 38, interaction section 40, and outlet section 42 of fluidic device 10 of FIGURES 1, 2, and 3. As described thus far, device 80 is essentially identical to fluidic device 10. The difference between these constructions resides in the provision of axial and lateral adjustment means for the inlet and outlet flow separators of the present embodiment, the structural form and purposes of which adjustment means are now to be described.

The position of the outlet flow separator 118 is adjustable axially in order to effect changes in length of the interaction region 124. This adjustment is accomplished by a cam assembly 128 comprising a cam screw 130 and a lock nut 132. Lock nut 132 threadably engages a threaded end portion of the cam screw to retain the screw in a selected rotational position. The shank of the cam screw is rotatably disposed in a close fitting passage 134 of casing 82, which passage opens into an enlarged pocket area 138 of generally rectangular configuration. The lower end of screw 130 is formed with a circular cam of larger diameter than its shank and having an axis substantially offset with respect to the axis of the shank. Cam 136 is rotatably disposed in the closed pocket 138 with only the transverse walls of the pocket positioned to engage the surface of cam 136, the axially directed sidewalls of the pocket being spaced sufficiently to prevent engagement therewith as the cam rotates.

In order to maintain the outlet flow separator 118 parallel to the sidewalls of passage 84 as its position is adjusted axially, an integral tongue 140 of separator 118 is formed to project into an axially aligned guide slot 142 of a guide member 144 which is fixedly disposed within the downstream end of passage 84 as shown. A pair of tabs depending from the underside of each leg of separator 118 extend into respective longitudnial guide slots formed in the bottom surface of the casing to aid in this guiding function. In FIGURE 13, only one such tab 146 and its associated guide channel 148 are visible.

In order to prevent leakage around the shank of cam screw 130, a standard O-ring seal 150, is seated in a mated annnular groove of the shank, with its outer surface in sealing relationship with the adjacent passage.

Adjustment of the axial position of the flow separator 118 is accomplished by the loosening of the lock nut 132 and rotating the cam screw 130, thereby causing the eccentric cam 136 to shift the separator axially in proportion to the extent of rotation. Guide tabs 140 and 146 maintain the separator 118 in a parallel relationship with the axis of casing 82 as the adjustment is made. When the desired position has been reached the lock nut 132 is again tightened to prevent inadverent shifting of the separator. Thus the length of the interaction region of the device may be readily altered in the shop or in the field to accommodate broad variations in a number of different conditions, such as changes in density or viscosity of the power jet fluid or the secondary control fluid as well as changes in environmental pressure and temperature. Also, operating characteristics under given fluid and environment conditions may be altered. For example, for given fluid and environment parameters, switching response time may be very precisely set to a selected value within the range of adjustment. Furthermore adjustment may be made to meet precise dimensional specifications thereby materially relaxing manufacturing tolerances. It should also be noted that such adjustments may be made during actual device operation which permits prompt and effective compensation to condition changes without system shutdown.

Adjustment of the width of the power jet nozzles 114 and 115 of the inlet section is accomplished through a second cam mechanism 152 associated with the inlet flow separator 110. The mechanism comprises a cam screw 154 which is essentially identical to cam screw 130, including an enlarged eccentrically disposed circular cam portion 156 positioned in a closed cam pocket 158 formed in the separator 110 upstream of the control port 94. The shank of cam screw 154 is rotatably disposed in a close-fitting aperture 160 formed through the upper wall portion of the casing 82 with sealing being accomplished by means of an O-ring 162. The cam screw is locked in place by means of a locknut 164. In this instance, however, cam portion 156 engages the axially oriented sidewalls of cam pocket 158 and is sufficiently spaced from the transverse side walls to prevent engagement therewith during rotation of the cam screw. The control port 94 is formed through an integral cylindrical boss portion 168 which is rotatably disposed in close fitting relation in an aperture 170 formed through the bottom wall portion of casing 82. An O-ring 172 is disposed in a corresponding groove in the bore 170 and engages the adjacent wall of the boss portion to prevent leakage.

Loosening the lock nut 164 and rotating the cam screw 154 causes the cam portion 156 to shift its position relative to the axis of the shank of the cam screw, and since it engages the axially oriented walls of the cam pocket 158, it tends to shift the inlet flow separator 110 in a transverse direction. Since the boss can rotate but cannot laterally shift its position, adjustment of cam screw 154 causes pivoting of the flow separator 110 about the axis of the boss. For example, assuming an initial condition as shown in FIGURE 12, rotation of the cam screw 154 in a counter-clockwise direction likewise pivots the flow separator 110 in a counter-clockwise direction to narrow power jet nozzle 114 and widen power jet nozzle 115. Rotation of the cam screw in a clockwise direction provides the reverse effect.

A very slight reduction in the cross-section of a power jet reduces its mass and renders it more sensitive to changes in pressure such that switching time is decreased; the thicker jet responds more slowly due to its increased mass. However, continued thinning of one power jet relative to the other begins to noticeably increase the permeability of the thinner jet to the secondary control fluid while concurrently and proportionately decreasing the permeability of the thicker jet. As a result, the response time of the thinner jet to an applied pressure differential is now actually lengthened providing an adjustable time delay effect. For example, assuming that the power jet nozzle 114 is narrowed and that the valve discs are in the positions shown in FIGURE 12, opening of the control port 94 and concurrent closing of the control port 106 switches the jets from a converged condition to a flow condition in which the jet adjacent closed port 96 is locked to the passage way by the Coanda effect. With the nozzle 114 narrowed, however, a portion of the secondary fluid entering control port 94 passes through the more permeable power jet thus increasing the time required to satisfy the vacuum between the jets and also the time needed to establish a vacuum between the thinner power jet and its associated casing wall. As a result, switching of the thinner power jet from the outlet 92 to the outlet 88 is delayed. A similar time delay occurs when the valve discs are returned to their positions shown in FIGURES 12 and 13 to converge the power jets. Movement of the thicker power jet is, of course, delayed in proportion to its increased mass.

The amount of time delay can be very critically set by adjustment of the cam screw 154. Furthermore, adjustment by means of the cam screw 154 is useful in accommodating power jet fluids of widely varying character and also to match the response characteristics of different fluids in the inlet pasages 112 and 113, respectively. Also, changes in control fluid characteristics as well as environmental temperature and pressure may be compensated for simply and precisely.

The adjustment mechanisms 128 and 152 may also be used to cause the power jets to prefer one of the outlets over the others. For example, with all control ports open, the normal flow path for the jets may be shifted from the split outlet passages, 88 and 90 to central passage 120 by lengthening the interaction region. Thus, adjustment may cause the fluidic device 80 to be monostable or bistable, as required, for any particular specification.

An alternate form of monostable device may be made by eliminating control ports 96 and 98 and by increasing the depth of the steps 100 and 102 in the opposite sidewalls of casing 84 such that a Coanda wall-attachment effect can no longer be achieved. If the interaction section axial length is adjusted and the transverse distance between the power jets is increased such that flow is normally directed out the split passages 88 and and 90, convergence of the jets and flow into passage 120 may be effected merely by closing the control port 94. When the control port 94 is again opened, the power jets will switch back to the outlets 88 and 90. In this alternate form, the sidewalls of the casing in the interaction region are actually unnecessary and may be eliminated, if desired, with a corresponding reduction in impedance to flow. Of course, the top and bottom walls of the casing in the interaction region are necessary to define, in conjunction with the divided power jets, and enclosed space for developing the low pressure condition between the jets required to converge the jets by a boundary layer self-attachment effect.

It will be understood that the fluidic devices according to this invention may be used as oscillators by altering the construction in accordance with the teachings of applicant's parent application, Ser. No. 623,740, filed Mar. 16, 1967.

The fluidic device of this invention is considerably more versatile than those of the prior art. When the device is used for simultaneous switching of two split portions of a power jet, the speed of response is substantially doubled, since the surface area subjected to the pressure of the secondary control fluid is approximately twice that of a comparable prior art planar fluidic device having a single power jet of like flow volume and thickness. Furthermore, the device of the present invention provides an extremely versatile logic element for a computer or a numerical control system, for example, because of the large number of combinations of distinct signals which can be obtained as illustrated by the truth table of FIGURE 11. The device also provides a very simple and yet foolproof mixing device for mixing additives to a fluid either liquid or gaseous, for example, in proportioning tetraethyl lead additions to gasoline.

A system employing a pair of power jets has been illustrated by way of example only; the more general nature and utility of the invention should be recognized and understood. For further example, the inlet passage 86 in FIGURE 12 may be widened to accommodate a second flow divider similar to divider 110 and having an associated control port. Thus, there would be defined three inlet power jets, two between the outer legs of the respective dividers and the adjacent casing walls, and a third between the internal legs of the two dividers. The center power jet could be selectively deflected to converge and attach to either of the other power jet streams by closure of the appropriate control port, and of course, the outer power jets could be selectively attached to the adjacent walls by proper control port closure.

By the way of a distinctly different type of modification to the system, the number of power jet inlets may be increased in a manner so as to maintain contact of each jet with an outer casing wall and an associated control port. For instance, similar, separate planar jets to those previously described may be formed adjacent the top and bottom walls of the casing in addition to the two jets developed adjacent the vertical sidewalls of the casing. These jets would cooperate with each other in the same manner as the vertical planar jets already described and may be further arranged to interact with the separate vertical jets. Such increases in the number of independent power jets (regardless of their cross-sectional appearance) which are arranged about a central enclosed space for interaction by boundary layer self-attachment increases the degrees of freedom in the system and the range of functions it may perform. This has been most amply exemplified by illustration of the advantages of the two jet system specifically considered over the singular annular jet of the aforementioned parent application. Further extensions of these principles will be obvious to those skilled in the art.

While particular embodiments of the present invention have been shown and described, it is apparent that various changes and modifications may be made, and it is therefore intended in the following claims to cover all such modifications and changes as may fall within the true spirit and scope of this invention.

What is claimed is:

1. A fluidic device having an inlet, interaction and an outlet zone comprising:
   inlet means within said inlet zone for developing a plurality of independent power jets and, for projecting said independent power jets into said interaction zone;
   means within said interaction zone and including said independent power jets for defining a confined space devoid of physical structure;
   control means including a control fluid conduit opening into said confined space for normally providing control fluid flow thereto to replace that entrained by said independent power jets but adapted for restricting control fluid flow to said confined space to selectively converge said independent power jets into a single stream by boundary layer attachment of the fluid of said power jets;
   and outlet means within said outlet zone comprising a plurality of separate outlet channels for collecting said power jet fluid flowing from said interaction zone.

2. The combination according to claim 1 and further including:
   wall means, extending between said inlet means and said outlet means, positioned adjacent and normally laterally spaced from the outermost boundaries of each of said plurality of power jets, said wall means having a plurality of control ports defined therein which open to respective ones of said plurality of jets adjacent the inlet end of said wall means; and
   second control means for selectively closing an assigned one of said control ports for effecting attachment of a corresponding power jet to said wall means.

3. The combination according to claim 2 in which:
   said fluidic device is so constructed and arranged that said attachment of a power jet to said wall means precludes convergence of said jet by boundary layer self-attachment.

4. The combination according to claim 3 and further including:
   first adjustment means for selectively altering the spacing between said inlet and said outlet means for effecting a predetermined variation in the operational characteristics of said fluidic device.

5. The combination according to claim 4 and further including:
   second adjustment means for altering the cross-sectional dimensions of said jets relative to one another at said inlet means for effecting a predetermined variation in the operational characteristics of said fluidic device.

6. The combination according to claim 5 in which:
   said first and second adjustment means each include an adjustment control mechanism exterior of said fluidic device for effecting said adjustments while said fluidic device remains in operation.

7. The combination according to claim 3 in which:
   said power jet fluid normally flows in a straight line between said inlet and said outlet means and in which convergence of said jets by boundary layer self-attachment diverts said jets to a central axis of said fluidic device.

8. The combination according to claim 7 in which:
   said inlet means develops a pair of power jets of rectangular cross-section with the planes defined by the elongated sides of said jets being parallel to one another and in which said jets are positioned on opposite sides of said central axis.

9. The combination according to claim 8 in which:
   said inlet means comprises a pair of walls adjacent said elongated sides of said power jets and transverse top and bottom walls and an internal flow separator of generally U-shaped configuration having elongated legs disposed between and parallel to said jets and having an open end facing downstream; and in which said conduit of said first control means extends through one of said transverse walls to communicate with said separator between said elongated legs thereof.

10. The combination according to claim 9 in which:
    said outlet means comprises a housing of rectangular cross-section with an internal flow separator of generally U-shaped configuration having elongated legs disposed within and parallel to a pair of walls of said housing and aligned on a common axis with said inlet separator and having an open end facing upstream toward said jets for defining, in conjunction with said housing, three fluid flow passages.

11. The combination according to claim 10 in which:
    both of said jets are selectively deflected to a predetermined one of the outer two of said three outlet passages only by closure of said first control conduit prior to closure of one of said control parts in said wall means.

12. A planar fluidic element comprising:
    inlet means for developing two generally parallel power jets of fluid;
    control means for subjecting said two power jets to pressure of a secondary fluid for controlling relative convergence and divergence of the power jets;
    outlet means comprising a central outlet passage and a pair of outlet passages disposed on opposite sides of said central passage, each of said passages being constructed and arranged for receiving the flow of one or both of said power jets;
    first adjustment means for selectively varying the distance between said power jet forming means and said outlet passages to change the operational characteristics of the fluidic element;
    and second adjustment means for selectively varying the relative thickness of said two power jets for effecting a second predetermined variation in the operating characteristics of said fluidic element.

13. A fluidic element having serially aligned inlet, interaction and outlet zones comprising:
    inlet means for directing two generally parallel, laterally spaced power jets or fluid from said inlet zone into said interaction zone;
    wall means positioned within said interaction zone and comprising first and second vertically spaced wall members respectively tangent to the upper and lower limits of said pair of laterally spaced power jets for defining, in conjunction with said power jets, an enclosed interaction space devoid of physical structure;
    fluid interaction control means comprising a single control inlet communicating with said enclosed space for normally providing flow of a secondary control fluid to said enclosed space to replace that withdrawn from said enclosed space through entrainment by said power jets but adapted to restrict control fluid flow to said enclosed space to selectively converge said jets into a single stream by boundary layer self-attachment of the fluid of said two power jets;

and outlet means comprising a plurality of laterally spaced outlet ducts located within said outlet zone for receiving the power jet fluid flowing from said interaction zone.

14. A planar fluidic element having serially aligned inlet, interaction and outlet zones, comprising:

inlet means including a walled flow channel having laterally spaced sidewalls and vertically spaced top and bottom walls, and including a U-shaped flow divider having its spaced sidewalls set inwardly of said channel sidewalls and extending vertically between said top and bottom walls to define a pair of laterally spaced channels for splitting an inlet power jet into a pair of laterally spaced power jets, the open end of said U-shaped flow divider facing downstream toward said interaction zone and with said flow divider sidewalls terminating at the commencement of said interaction zone for projecting the power jets from said laterally spaced inlet channels into the free space of said interaction zone;

wall means extending the full length of said interaction zone and including vertically spaced top and bottom walls integral with said top and bottom walls of said inlet means for defining, in conjunction with said laterally spaced power jets, an enclosed space devoid of physical structure;

fluid interaction control means comprising a single control inlet communicating with said enclosed space through the open end of said U-shaped flow divider for regulating flow of a secondary control fluid to said enclosed space to selectively converge said power jets into a single stream by boundary layer self-attachment of the fluid of said pair of power jets in the absence of a control fluid flow to said enclosed space;

and outlet means comprising a plurality of laterally spaced outlet passages located within said outlet zone for receiving the power jet fluid flowing from said interaction zone.

15. The fluidic element of claim 14 and in which said wall means comprises a pair of interaction region sidewalls spaced laterally outward of said power jets and extending the full length of said interaction region and further comprising wall-attachment control means including control inlet in each of said interaction region sidewalls for individually regulating flow of a secondary control fluid to the exterior boundaries of an associated power jet to selectively lock said power jet to the associated one of said interaction region sidewalls in the absence of a control fluid flow into said control inlet of said one sidewall.

16. The fluidic element of claim 15 in which said outlet means includes a first outlet flow passage having its central axis colinear with a line parallel to the longitudinal axes of said inlet flow channels and centrally disposed therebetween and further in which said outlet means includes second and third outlet flow passages disposed sides of said first flow passage.

17. The fluidic element of claim 16 in which said outlet means includes a pair of laterally spaced sidewalls defining the lateral limits of said first outlet flow passage and in which the aforesaid sidewalls lie in a common plane with a respective one of said longitudinal axes of said inlet flow channels for causing each of said power jets to normally divide its fluid flow between said first outlet passage and respective ones of said second and third outlet passages.

References Cited

UNITED STATES PATENTS

| | | | |
|---|---|---|---|
| 3,039,490 | 6/1962 | Carlson | 137—81.5 |
| 3,080,886 | 3/1963 | Severson | 137—81.5 |
| 3,181,545 | 5/1965 | Murphy | 137—81.5 |
| 3,266,513 | 8/1966 | Voit | 137—81.5 |
| 3,334,657 | 8/1967 | Smith et al. | 137—604 |
| 3,366,131 | 1/1968 | Swartz | 137—81.5 |
| 3,375,840 | 4/1968 | Fox et al. | 137—81.5 |
| 3,398,758 | 8/1968 | Unfried | 137—81.5 |

SAMUEL SCOTT, Primary Examiner